United States Patent [19]

Yamaguchi et al.

[11] Patent Number: 4,751,328

[45] Date of Patent: Jun. 14, 1988

[54] PROCESS FOR PRODUCING AMINOBENZYLAMINES

[75] Inventors: Keizaburo Yamaguchi; Kenichi Sugimoto; Yoshimitsu Tanabe; Midori Yamazaki; Akihiro Yamaguchi, all of Tokyo, Japan

[73] Assignee: Mitsui Toatsu Chemicals, Inc., Tokyo, Japan

[21] Appl. No.: 931,954

[22] Filed: Nov. 24, 1986

Related U.S. Application Data

[63] Continuation of Ser. No. 647,409, Sep. 5, 1984, abandoned.

[30] Foreign Application Priority Data

Sep. 12, 1983 [JP] Japan .................. 58-166784
Feb. 23, 1984 [JP] Japan .................. 59-31371
Feb. 27, 1984 [JP] Japan .................. 59-34404

[51] Int. Cl.$^4$ ........................... C07C 85/11
[52] U.S. Cl. .................. 564/385; 564/415; 564/416; 564/422; 564/423
[58] Field of Search ............... 564/385, 415, 416, 422, 564/423

[56] References Cited

FOREIGN PATENT DOCUMENTS 83573 8/1971 German Democratic Rep. .

OTHER PUBLICATIONS

Smith, P. A. S. *The Chemistry of Open-Chain Organic Nitrogen Compounds*, vol. 1, pp. 66–67, (1965).
J. Am. Chem. Socl, 71, 2137 (1949)–N. Kornblum et al.
Synth. Commn., 7, 71–78 (1977)–A. Siddiqui et al.
NRL Report 6439–J. R. Griffith et al.
J. Medicinal Chem., 20, 1189 (1977)–N. C. Brown et al.
"Jikken Kagaku Koza", vol. 17, Maruzen, 313 (1956) Ed. by Nippon Kagakukai.
W1, Gulewitsch. Ber., 57, 1645 (1924).
J. Am. Chem. Soc., 47, 3051–3057 (1925)–W. H. Carothers et al.
J. Org. Chem., 25, 1658–1660 (1960)–F. E. Gould.
Ber., 56, 2258–2262 (1923)–K. W. Rosenmund et al.
J. Am. Chem. Socl, 50, 3370–3374 (1928)–W. H. Hartung.

*Primary Examiner*—Glennon H. Hollrah
*Assistant Examiner*—John A. Sopp
*Attorney, Agent, or Firm*—Jeffers, Hoffman & Niewyk

[57] ABSTRACT

Aminobenzylamines are produced by catalytically reducing o-, m- or p-nitrobenzaldoxime in an organic solvent in the presence of a compound selected from the group consisting of (a) boric acid, phosphoric acid and/or anhydrides thereof, (b) $CO_2$ gas and (c) an organic acid. The starting material, nitrobenzaldoxime is produced by reaction of the corresponding nitrobenzaldehyde with hydroxylamine.

4 Claims, No Drawings

PROCESS FOR PRODUCING AMINOBENZYLAMINES

This is a continuation of application Ser. No. 647,409, filed Sept. 5, 1984, now abandoned.

BACKGROUND OF THE INVENTION

This invention relates to a new process for the production of aminobenzylamines and particularly, to a process useful for industrial practice.

The aminobenzylamines are an important substance as a curing agent for epoxy resins, a starting material for polyamides and polyimides and a material for intermediates of agricultural chemicals.

It is, hitherto, known that aminobenzylamines are produced starting from nitrobenzaldehyde or nitrobenzonitrile.

As for the former, there are known the following processes:

(1) Nitrobenzylbromide is derived from nitrobenzaldehyde, which is then reacted with potassium phthalimide to obtain N-(m-nitrobenzyl)-phthalimide, and m-aminobenzylamine is produced with an yield of about 20% by a two-step reduction reaction (N. Kornblum et al, J. Am. Chem. Soc., 71, 2137 (1949)).

(2) m-Nitrobenzaldehyde is reacted with phenylhydrazine and the resulting hydrazone compound is catalytically reduced whereby m-aminobenzylamine is obtained with an yield of 60% (A. Siddiqui et al, Synth. Commn. 7, 71-78 (1977)).

(3) Starting from m-nitrobenzaldehyde, m-nitrobenzaldoxime is formed, which is then catalytically reduced under a high pressure by means of Raney nickel catalyst whereby m-aminobenzylamine is obtained with an yield of 52% (J. R. Griffith et al, NRL Report 6439).

On the other hand, processes starting from the latter are as follows:

(4) p-Aminobenzonitrile derived from p-nitrobenzonitrile is reduced by lithium aluminum hydride and thus, p-aminobenzylamine is obtained with an yield of 37% (N. C. Brown et al, J. Wedicinal Chem., 20 1189 (1977)).

(5) By catalytically reducing m-nitrobenzonitrile with Raney nickel under a high pressure, m-aminobenzylamine is obtained with an yield of 49% (J. R. Griffith et al, NRL Report 6439).

As mentioned above, according to processes (1) and (2), a relatively expensive compound such as potassium phthalimide and phenylhydrazine is used in the amount of more than equivalent and the resulting intermediate is reduced to obtain end products. However, these processes have disadvantages that the reaction steps are complicated and for recovery of the by-products expenses and labour are required. Process (4) has disadvantages that the reducing agent is expensive and difficult in handling. As for processes (3) and (5) of using Raney nickel catalyst and effecting the catalytic reduction in an autoclave under a high pressure, there are disadvantages that the apparatus are expensive and the volume efficiency is low.

Generally, in a process for producing benzylamines by a conventional reduction method from benzonitriles or benzaldoximes, the yield of benzylamine is low because of by-producing secondary amines and ammonia. For example, in case of catalytically reducing benzonitrile in ethanol with a Ni catalyst, the yield of benzylamine is 40-50% and the yield of dibenzylamine is 20% (Ed. by Nippon Kagakukai, "Jikken Kagaku Koza" Vol. 17, Maruzen, 313 (1956)). Also, in case of catalytically reducing benzaldoxime in water/alcohol with a Pd colloidal catalyst, the yield of benzylamine is 47% and the yield of dibenzylamine is 41% (W1, Gulewitsch. Ber., 57 1645 (1924)).

This reason is explained as follows: in both the reductions of benzonitrile and benzaldoxime, benzalimine is formed at the beginning, which causes various reactions such as formation of benzaldehyde due to hydrolysis of benzalimine and condensation of benzalimine with benzaldehyde. Thus, the resulting by-products bring about low yield of benzylamine.

Accordingly, for the purpose of controlling the formation of such by-products and improving the yield of benzylamine, there are provided processes using acetic anhydride or dried hydrogen chloride in the reduction step. For example, in case of effecting the reduction with use of acetic anhydride in the amount of 2.65 mols per mol of benzonitrile, benzylamine is obtained with an yield of 69% and in case of 12.7 mols the yield is 91% (W. H. Carothers et al, J. Am. Chem. Soc., 47 3051-3057 (1925); F. E. Gould et al J. Org. Chem., 25 1658-1660 (1960)).

Also, by reaction of benzaldoxime with acetic anhydride benzaldoxime acetate is formed, which is then reduced, thus benzylamine being obtained with 91% (K. W. Rosenmund et al, Ber., 56 2258-2262 (1923)). These processes of reducing benzonitrile or benzaldoxime in the acetic anhydride solvent comprise isolating N-acetylbenzylamine and hydrolysing same to obtain benzylamine.

On the other hand, according to a process using dried hydrogen chloride, the dried hydrogen chloride gas is used in the amount of more than 1 equivalent for benzonitrile and of more than 3 equivalents for benzaldoxime and thus benzylamine is obtained with high yield (W. H. Hartung, J. Aw. Chem. Soc., 50 3370-3374 (1928)).

As mentioned above, the reduction process of benzonitrile or benzaldoxime using acetic anhydride or dried hydrogen chloride is effective for improving the yield of benzylamine, in which the acetic anhydride and hydrogen chloride are considered as having a function of stabilizing the intermediate in the course of the reduction and as exhibiting an effect of catching water formed in case of benzaldoxime thereby controlling the decomposition reaction. However, the process using acetic anhydride has the disadvantage that a comparatively expensive acetic anhydride must be used in a large quantity. Also, as for the process using dried hydrogen chloride, it is necessary to use the solvent in anhydrous condition and also, due to the delay of hydrogen absorption a diluted solution is required and there is a serious disadvantage that the deterioration of catalyst is remarkable and the material of apparatus is injured.

In case the above processes are applied for the reduction of nitrobenzaldoxime in addition to the above problems further complicated reactions are expected due to the nitro group. Namely, there are considered a reaction with an amino group formed by reduction of the nitro group, a hydrolysis caused by water formed and a side reaction of aminobenzaldehyde formed by this hydrolysis. For controlling these side reactions, it is necessary to use the acetic anhydride or dried hydrogen chloride in further large quantities.

Therefore, it is to be noticed that it is very difficult to produce aminobenzylamine in a commercial scale by the conventional processes.

SUMMARY OF THE INVENTION

An object of this invention is to provide a new process for the production of aminobenzylamine having overcome the disadvantages in the conventional processes.

Another object of this invention is to provide a process for the production of aminobenzylamine using nitrobenzaldoxime produciable easily from nitrobenzaldehyde.

A further object of this invention is to provide the process for producing aminobenzylamine by simplified steps and using relatively cheap reactants.

These objects can be attained by a process which comprises catalytically reducing o-, m- or p-nitrobenzaldoximes represented by general formula I,

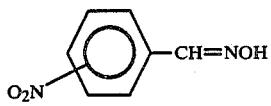   I in the presence of a compound selected from the group consisting of (a) boric acid, phosphoric acid and/or anhydrides thereof, (b) $CO_2$ gas and (c) an organic acid.

DETAILED DESCRIPTION OF THE INVENTION

The reduction according to this invention is carried out in an organic solvent in the presence of (a) boric acid, phosphoric acid and/or anhydrides thereof. Therefore, products in the course are present in a stable form as borates or phosphates of aminobenzylamine. Namely, various intermediates formed on the reduction, such as amines and imines are stabilized as their borates and phosphates and also, the basicity of amino or imino groups in the borate or phosphate is lowered. For these reasons the decomposition and side reactions are controlled and consequently, the reduction of the nitro group to amino group and the reduction of the aldoxime group to aminomethyl group are rapidly advanced so that end product, aminobenzylamine can be selectively produced. Further, in case of using boric anhydride or phosphoric anhydride, three molecules of water are formed by the reduction of nitrobenzaldehyde, which are converted to two molecules of boric acid and phosphoric acid, respectively. Therefore, there is the advantage that side reactions such as hydrolysis do not at all take place.

After completion of the reaction, aminobenzylamine may be separated and purified as its borate or phosphate or may be isolated by neutralization followed by distillation.

Alternatively, the reduction according to this invention may be carried out in an organic solvent in the presence of (b) $CO_2$ gas. Herein, the $CO_2$ gas is converted to carbonic acid by the presence of water and therefore, products in the course are present in a stable form as carbonate of aminobenzylamine.

Namely, on the reduction of nitrobenzaldoxime $CO_2$ gas is converted to carbonic acid by water which is formed by reduction of nitro groups and accordingly, various intermediates such as amines and imines which are formed by merely introducing $CO_2$ gas into the reduction system are stabilized as their carbonates. Further, the basicity of amino or imino group in the carbonate is lowered whereby the decomposition and side reactions are controlled. Consequently, the reduction of the nitro to amino and the reduction of the aldoxime to aminomethyl are rapidly advanced so that aminobenzylamine can be selectively produced.

After completion of the reaction, aminobenzylamine may be separated and purified as its carbonate or may be easily isolated by neutralization followed by distillation.

Further alternatively, the reduction according to this invention may be carried out in the presence of (c) an organic acid in an organic solvent. Herein, products in the course are stabilized as organic acid salts of aminobenzylamine. Namely, various intermediates such as amines and imines which are formed on the reduction are stabilized as their organic acid salts and also, by lowering the basicity of amino or imino group in the organic acid salt the decomposition and side reactions are controlled. Consequently, the reduction of the nitro to amino and the reduction of the aldoxime to aminomethyl are rapidly advanced so that aminobenzylamine can be selectively produced. After completion of the reaction, aminobenzylamine may be separated and purified as its organic acid salt or may be isolated by neutralization followed by distillation.

The process of this invention has the advantages that the catalytic activity is not reduced so that the catalyst after recovery can be used repeatedly and the end product can be isolated in a very simple manner after completion of the reaction.

The starting material used in this invention is o-, m- or p-nitrobenzaldoxime which is produced easily by reacting the corresponding nitrobenzaldehyde with hydroxylamine which is industrially available at a cheap cost.

As to (a) boric acid, phosphoric acid and/or anhydrides thereof are used in this inventron and referred to as mineral acid, and preferably, boric acid and boric anhydride are used. These mineral acids are used within the amount of 0.2 equivalents or more relative to nitrobenzaldoxime, preferably 1 to 3 equivalents. The mineral acid may be used in the form of solution or suspension in a solvent together with the starting material.

Also, (b) $CO_2$ gas may be used in any form of vapour, liquid and solid. The amount is within the range of 0.5 equivalents or more, preferably 1 to 10 equivalents relative to nitrobenzaldoxime. The $CO_2$ gas may be charged together with the starting material or may be added during the reaction.

Examples of (c) organic acids which may be used in this invention include an aliphatic mono- or di-carboxylic acid such as formic acid, acetic acid, propionic acid, oxalic acid, malonic acid, succinic acid and maleic acid, an aromatic carboxylic acid such as benzoic acid and phthalic acid, sulfonic acids and sulfinic acids, e.g. p-toluenesulfonic acid and benzenesulfinic acid. Particularly, acetic acid is preferred. Among the above-mentioned organic acids, a part of carboxylic acids may be also used as its anhydride. The amount is within the range of 0.2 equivalents or more, preferably 1 to 3 equivalents relative to nitrobenzaldoxime. The organic acid may be used in the form of solution or suspension in a solvent together with the material and may be used alone or in mixture of two or more.

The solvent which may be used in this invention is, for example, alcohols, glycols and ethers, e.g. methanol, ethanol, iso-propyl alcohol, n-butyl alcohol, sec-butyl alcohol, methylcellulose, ethylcellosolve, ethylene glycol, propylene glycol, diglyme, tetraglyme, dioxane, tetrahydrofurane. In some cases, there are used aliphatic hydrocarbons, aromatic hydrocarbons, esters and halo-hydrocarbons, e.g. hexane, cyclohexane, benzene, toluene, ethyl acetate, butyl acetate, dichloromethane, chloroform, 1,1,2-trichloroethane and the like. These solvents may be used alone or in mixture of two or more and may include water. The amount is not particularly limited, though 1 to 15 parts per 1 weight part of the starting material are sufficient.

The reducing catalyst which may be used in this invention may be conventional one, e.g. nickel, palladium, platinum, rhodium, ruthenium, cobalt and copper. Preferably, Raney nickel and palladium catalysts are used. Though these catalysts may be used in the form of metal, they may be in the form supported on a carrier such as carbon, barium sulfate, silicagel and alumina. Also, nickel, cobalt and copper may be also used as Raney catalysts. The amount of catalyst is within the range of 0.01–30 wt. % as the metal relative to nitrobenzaldoxime, the range of 2–20 wt. % for the Raney catalyst and the range of 0.05–5 wt. % for the supported catalyst.

The reaction temperature is not particularly limited, though it is within the range of 0° to 150° C., preferably 10° to 80° C. The reaction pressure may be usually normal pressure to 50 Kg/cm$^2$·G.

As for general modes of practice of this invention, the catalyst may be added to a solution or suspension of the mineral acid or organic acid and starting material in a solvent. Also the catalyst may be added to a solution or suspension of the starting material in a solvent and then indicated amount of $CO_2$ gas may be all added or may be added continuously or intermittently till the absorption of hydrogen charged at indicated temperature ceases. After completion of the reaction, the resulting product in the form of solution is filtered to remove the catalyst and neutralized with sodium hydroxide, potassium hydroxide, ammonia, triethylamine and the like, followed by distillation to obtain the end product. Also, the resulting mixture having crystals deposited therein is filtered and the salt of aminobenzylamine is isolated and purified, followed by neutralization to obtain the end product.

EXAMPLE 1

453 g (3 mols) of p-nitrobenzaldehyde was dissolved in 1350 ml of methanol and then, an aqueous solution of 241 g (3.3 mols) of hydrochloric acid hydroxylamine hydrochloride in 300 ml of water was added dropwise over 30 minutes while maintaining the reaction temperature at 30° C. Thereafter, stirring was effected at the same temperature for two hours and the mixture was diluted with 2000 ml of water. White crystals deposited were filtered, washed with water and dried. 480 g of p-nitrobenzaldoxime was obtained (yield, 96.5%). M.P. 128° to 131° C.

33.2 g (0.2 mol) of this p-nitrobenzaldoxime, 18.3 g (0.25 mol) of boric anhydride, 1 g of a 5% Pt-C catalyst and 100 ml of methanol were charged into a hermetically sealed glass container and vigorously stirred while charging hydrogen. Reaction was continued at temperatures of 25° C. to 30° C. for 13.5 hours and 22.2 l of hydrogen was absorbed. Next, this reaction mixture was filtered to remove the catalyst and methanol was distilled off by concentration under reduced pressure. A yellow viscous liquid thus obtained was neutralized by adding 57 g (0.5 mol) of a 35% aqueous solution of sodium hydroxide and then, the liquid was separated to two layers. The lower layer, a colorless and transparent aqueous solution of sodium borate was removed and then, a brown and oily crude p-aminobenzylamine was obtained. This crude p-aminobenzylamine was subject to vacuum distillation at pressure of 5 to 6 mmHg and 22.5 g of fractions between 129.5° C. and 130° C. was obtained (yield 92.1%). The purity by means of gas chromatography was 99.93%.

| Elementary analysis $C_7H_{10}N_2$ | | | |
|---|---|---|---|
| | C | H | N |
| Calculated (%) | 68.8 | 8.25 | 22.9 |
| Found (%) | 68.9 | 8.4 | 22.7 |

EXAMPLE 2

To 5 l of water warmed at 50° C. was 453 g (3 mol) of m-nitrobenzaldehyde added and then, 218 g (3.3 mol) of a 50% aqueous solution of hydroxylamine (manufactured by Nisshin Kako) was added dropwise under stirring and further, stirred at the same temperature for 3 hours. Thereafter the mixture was cooled to room temperature, filtered, washed with water and dried. 488 g of m-nitrobenzaldoxime was obtained. Yield 98%; M.P. 118°–121° C.

33.2 g (0.2 mol) of this m-nitrobenzaldoxime, 70 g (0.35 mol) of a 50% aqueous solution of phosphoric acid, 0.3 g of a 10% Pt-C catalyst and 300 ml of isobutanol were charged into a hermetically sealed glass container and vigorously stirred while charging hydrogen. Reaction was continued at temperatures of 25° to 30° C. for 18 hours and 23 l of hydrogen was absorbed. The reaction mixture from which crystals deposited was filtered and 54.8 g of crude m-aminobenzylamine phosphoric acid salt (yield 86.1%) was obtained. This crude m-aminobenzylamine phosphoric acid salt was recrystallized from a 50% methanol-water solution and pure m-aminobenzylamine phosphoric acid salt of white and flaky crystals was obtained. M.P. 210°–213° C.

| Elementary analysis $C_{14}H_{29}N_4P_3O_{12}$ | | | | |
|---|---|---|---|---|
| | C | H | N | P |
| Cal. (%) | 31.9 | 5.6 | 10.6 | 17.6 |
| Found (%) | 31.79 | 5.86 | 10.6 | 17.76 |

Next, the above product was suspended in methylene chloride and ammonia gas was charged thereto. Deposited ammonium phosphate was removed by filtration and the resulting solution was concentrated and allowed to stand over night. Crystals of m-aminobenzylamine were obtained. M.P. 39°–43° C.

| Elementary analysis $C_7H_{10}N_2$ | | | |
|---|---|---|---|
| | C | H | N |
| Cal. (%) | 68.8 | 8.25 | 22.9 |
| Found (%) | 68.5 | 8.2 | 22.6 |

EXAMPLE 3

33.2 g (0.2 mol) of m-nitrobenzaldoxime obtained in Example 2, 3 g of Raney nickel, 30.9 g (0.5 mol) of boric acid and 150 ml of dioxane were charged into an autoclave and reaction was effected at 30° C. under a hydrogen pressure of 10 Kg/cm$^2$·G for five hours while vigorously stirring. After completion of the reaction, the resulting mixture was filtered to remove the catalyst, concentrated under reduced pressure and thereafter, was subject to the same post-treatment as in Example 1. 21.1 g of m-aminobenzylamine of 99.96% in purity was obtained. Yield 86.3%; B.P. 131°–132° C./6 mmHg).

EXAMPLE 4

33.2 g (0.2 mol) of m-nitrobenzaldoxime obtained in Example 2, 24.2 g (0.17 mol) of P$_2$O$_5$, 0.5 g of a 5% Pt-C catalyst and 200 ml of methanol were charged into a hermetically sealed glass container and reduction was carried out in the same conditions as in Example 1. The reaction time was 10 hours and the absorption of hydrogen was 22.6 l. Next, the resulting reaction mixture was filtered to remove the catalyst and 45 g (0.8 mol) of powdery potassium hydroxide was added carefully to deposit potassium phosphate. The deposits were removed by filtration. After distillation 21.7 g of m-aminobenzylamine of 99.4% in purity was obtained. Yield 88.9%; B.P. 129°–130° C./5 mmHg.

EXAMPLE 5

The same procedure as in Example 1 was carried out except using m-nitrobenzaldoxime obtained in Example 2 as the material, tetrahydrofurane as the solvent and a 5% Rh-C catalyst as the catalyst. m-Aminobenzylamine of 99.9% in purity was obtained with an yield of 89.2%.

EXAMPLE 6

16.6 g (0.1 mol) of m-nitrobenzaldoxime obtained in Example 2, 0.3 g of a 5% Pd-C catalyst, 14.2 g (0.1 mol) of P$_2$O$_5$ and 150 ml of toluene were charged into an autoclave and reaction was continued at temperatures of 40° to 50° C. under a hydrogen pressure of 3–5 Kg/cm$^2$·G for 7 hours while stirring vigorously. After completion of the reaction, the resulting mixture was cooled and filtered and 29.6 g of a mixture of crystals of crude m-aminobenzylamine phosphoric acid salt and catalyst was obtained. This crude product was treated in the same manner as in Example 2 and 10.2 g of a yellow oily substance was obtained (yield 83.6%). The purity by means of gas chromatography was 98.9%.

EXAMPLE 7

Using the 5% Pd-C catalyst which had been used repeatedly four times in the process of Example 1, p-nitrobenzaldoxime was reduced in the same manner. The reaction time was 19 hours. The yield of p-aminobenzylamine was 92.2%.

EXAMPLE 8

Using the 5% Pd-C catalyst which had been used repeatedly twice in the process of Example 4, m-nitrobenzaldoxime was reduced in the same manner. The reaction time was 14.5 hours. The yield of m-aminobenzylamine was 87.7%.

EXAMPLE 9

16.6 g (0.1 mol) of m-nitrobenzaldoxime obtained in Example 2, 0.3 g of a 5% Pd-C catalyst, 6.2 g (0.1 mol) of boric acid and 50 ml of ethanol were charged into a hermetically sealed glass container and stirred vigorously while charging hydrogen. Reaction was effected at temperatures of 20° to 25° C. for 8 hours. After reaction, the resulting mixture was filtered to remove the catalyst and was subject to the same post-treatment as in Example 1. 10 g of m-aminobenzylamine of 99.9% in purity was obtained (yield 82%).

EXAMPLE 10

The same procedure as in Example 9 was repeated except using half the amount of boric acid. m-Aminobenzylamine was obtained with an yield of 68.2%.

EXAMPLE 11

151 g (1 mol) of m-nitrobenzaldehyde was added to 1 l of water warmed at 70° C. and 72.6 g (1.1 mol) of a 50% aqueous solution of hydroxylamine was added dropwise under stirring and further, was stirred at the same temperature for one hour. The resulting mixture was cooled to room temperature and crystals thus deposited were filtered, washed with water and dried. 160.5 g of m-nitrobenzaldoxime was obtained (yield 96.6%; M.P. 118°–121° C.).

16.6 g (0.1 mol) of this m-nitrobenzaldoxime, 22 g (0.5 mol) of a solid CO$_2$, 1 g of Raney nickel catalyst and 150 ml of methanol were charged into an autoclave and hydrogen was charged while maintaining the pressure at 20 to 30 Kg/cm$^2$·G. Reaction was continued at temperatures of 20° to 25° C. for 8 hours under stirring. Thereafter, the resulting mixture was filtered to remove the catalyst, added with 6 g (0.15 mol) of sodium hydroxide and was subject to distillation. 10.6 g of m-aminobenzylamine of 99.1% in purity by means of gas chromatography was obtained. Yield 86.9%; B.P. 129°–130° C./5 mmHg; M.P. 39°–42° C.

| Elementary analysis C$_7$H$_{10}$N$_2$ | | | |
|---|---|---|---|
| | C | H | N |
| Cal. (%) | 68.8 | 8.25 | 22.9 |
| Found (%) | 68.1 | 8.4 | 22.6 |

EXAMPLE 12

The same manner as in Example 11 was repeated except using methyl chloride is the solvent. After completion of the reaction, the resulting mixture was filtered to remove the catalyst and thus, 10 g of crystals of m-aminobenzylamine carbonic acid salt was obtained (yield 58.8%), which was then recrystallized from isopropanol to obtain a pure product of white and needle crystals (M.P. 113° to 116° C.).

| Elementary analysis C$_{15}$H$_{22}$N$_4$O$_3$ | | | |
|---|---|---|---|
| | C | H | N |
| Cal. (%) | 58.8 | 7.24 | 18.3 |
| Found (%) | 59.3 | 7.03 | 18.47 |

EXAMPLE 13

52.9 g (0.35 mol) of p-nitrobenzaldehyde was dissolved in 100 ml of methanol and a solution of 27.8 g (0.38 mol) of hydroxylamine hydrochloride in 35 ml of water was added dropwise over 30 minutes while maintaining the temperature at 30° C. and then, stirred at the same temperature for two hours followed by dilution with 300 ml of water. White crystals deposited were filtered and dried to obtain 55 g of p-nitrobenzaldoxime. Yield 94.7%; M.P. 128°–131° C.

16.6 g (0.1 mol) of this p-nitrobenzaldoxime, 0.35 g of a 5% Pd-C catalyst and 100 ml of isopropyl alcohol were charged into a glass reactor and vigorously stirred while charging $CO_2$ gas at a rate of 30 ml per minute and feeding hydrogen. Reaction was continued at temperatures of 25° to 35° C. for 8 hours.

After completion of the reaction, the resulting mixture was filtered to remove the catalyst and the isopropyl alcohol was almost removed by concentration under reduced pressure. To a yellow viscous liquid thus obtained was 32 g (0.2 mol) of a 25% aqueous solution of sodium hydroxide added. After stirring the resulting mixture was separated to two layers by allowing to stand. The lower layer, a colorless and transparent aqueous solution was removed and then, a red-brown and transparent oily liquid was obtained, from which 7.9 g of fractions of 129°-130° C./5-6 mmHg was obtained by vacuum distillation. This is p-aminobenzylamine of 99.3% in purity by gas chromatography. Yield 81.1%.

| Elementary analysis $C_7H_{10}N_2$ | | | |
| --- | --- | --- | --- |
| | C | H | N |
| Cal. (%) | 68.8 | 8.25 | 22.9 |
| Found (%) | 68.4 | 8.3 | 22.7 |

EXAMPLE 14

52.9 g (0.35 mol) of o-nitrobenzaldehyde was dissolved in 150 ml of methanol and an aqueous solution of 27.8 g (0.38 mol) of hydroxylamine hydrochloride in 35 ml of water was added over 30 minutes while maintaining the temperature at 30° C. The mixture was stirred at the same temperature for two hours and diluted with 300 ml of water. White crystals deposited were filtered, washed with water and dried. 53 g of o-nitrobenzaldoxime was obtained. Yield 91%; M.P. 95°-98° C.

16.6 g (0.1 mol) of this o-nitrobenzaldoxime, 0.83 g of a 5% Pd-C catalyst and 100 ml of tetrahydrofurane were charged into a 250 ml autoclave and $CO_2$ gas was charged till the pressure reached 5 $Kg/cm^2 \cdot G$.

Next, hydrogen was charged while vigorously stirring the reaction mixture and reaction was continued at temperatures of 25°-35° C. under pressures of 20-30 $Kg/cm^2 \cdot G$ for 7 hours. After completion of the reaction, the resulting mixture was filtered to remove the catalyst and was added with 6 g (0.15 mol) of sodium hydroxide followed by distillation. 9.7 g of o-aminobenzylamine was obtained. Purity by gas chromatography 99.4%; Yield 79.4%; B.P. 91°-93° C./1 mmHg; M.P. 58°-61° C.

| Elementary analysis $C_7H_{10}N_2$ | | | |
| --- | --- | --- | --- |
| | C | H | N |
| Cal. (%) | 68.8 | 8.25 | 22.9 |
| Found (%) | 68.7 | 8.3 | 22.1 |

EXAMPLE 15

151 g (1 mol) of m-nitrobenzaldehyde was added to 1 l of water warmed at 70° C. and then, added with 72.6 g (1.1 mol) of a 50% aqueous solution of hydroxylamine under stirring. The mixture was stirred at the same temperature for one hour and cooled to room temperature and then, crystals deposited were filtered and dried. Thus 160 g of m-nitrobenzaldoxime was obtained. Yield 96%; M.P. 118°-121° C.

16.6 g (0.1 mol) of this m-nitrobenzaldoxime, 7.4 g (0.1 mol) of propionic acid, 1 g of Raney nickel and 50 ml of methanol were charged into an autoclave and hydrogen was charged till the pressure reached 20-30 $Kg/cm^2 \cdot G$. Reaction was effected at temperatures of 20°-25° C. for 4 hours while stirring vigorously the reaction mixture.

Next, the reaction mixture was filtered to remove the catalyst and was added with 4 g (0.1 mol) of sodium hydroxide followed by distillation. Thus, 9.7 g of m-aminobenzylamine was obtained (yield 79.4%). Purity by gas chromatography 99%; B.P. 129°-130° C./5 mmHg; M.P. 39°-42° C.

| Elementary analysis $C_7H_{10}N_2$ | | | |
| --- | --- | --- | --- |
| | C | H | N |
| Cal. (%) | 68.8 | 8.25 | 22.9 |
| Found (%) | 68.1 | 8.4 | 22.6 |

EXAMPLE 16

16.6 g (0.1 mol) of m-nitrobenzaldoxime obtained in Example 15, 7.2 g (0.12 mol) of glacial acetic acid, 50 ml of ethyl acetate and 0.5 g of a 5% Pd-C catalyst were charged into a hermetically sealed glass container and stirred vigorously while charging hydrogen. Reaction was continued at 25° C. for 12 hours.

After completion of the reaction, the resulting mixture was filtered to remove the catalyst, was added with 9.1 g (0.15 mol) of a concentrated ammonia water and sufficiently stirred. The mixture was separated to two layers by allowing it to stand. The lower layer was removed and the upper layer was distilled and then, 9.4 g of m-aminobenzylamine was obtained (yield 77%). Purity by gas chromatography 99.6%; M.P. 39°-42° C.

EXAMPLE 17

The procedure of Example 16 was repeated except using isopropanol as the solvent. After completion of the reaction the resulting mixture was filtered to remove the catalyst and concentrated under reduced pressure to remove almost the isopropanol. Then, a yellow viscous liquid was obtained, which was allowed to stand. Crystals deposited were filtered, washed with isopropanol and dried. Thus, 11.7 g of m-aminobenzylamine acetic acid salt of white needle crystals was obtained (yield 64.3%). M.P. 127°-130° C.

| Elementary analysis $C_9H_{14}N_2O_2$ | | | |
| --- | --- | --- | --- |
| | C | H | N |
| Cal. (%) | 59.15 | 8.13 | 15.28 |
| Found (%) | 59.32 | 7.74 | 15.37 |

EXAMPLE 18

16.6 g (0.1 mol) of m-nitrobenzaldoxime obtained in Example 15, 9.5 g (0.05 mol) of p-toluenesulfonic acid, 0.5 g of a 5% Pt-C catalyst and 75 ml of dioxane were charged into a hermetically sealed glass container and vigorously stirred while charging hydrogen. Reaction was continued at temperatures of 30° to 40° C. for 8 hours. Thereafter the resulting mixture was filtered to remove the catalyst and was added with 35 g (0.3 mol) of a 35% aqueous solution of sodium hydroxide.

After stirring, the mixture was allowed to stand and then, separated to two layers. The lower layer was removed and the upper layer was distilled. Thus 8.9 g of m-aminobenzylamine was obtained (yield 72.9%). Purity by gas chromatography 99.3%.

EXAMPLE 19

The reduction reaction was carried out in the same manner as in Example 15 except using oxalic acid as the organic acid and m-aminobenzylamine was obtained with an yield of 82%.

EXAMPLE 20

151 g (1 mol) of p-nitrobenzaldehyde was dissolved in 350 ml of methanol and an aqueous solution of 80.3 g (1.1 mol) of hydroxylamine hydrochloride in 100 ml of water was added dropwise over 30 minutes while maintaining the temperature at 30° C. Thereafter the mixture was stirred at the same temperature for 2 hours and diluted with 1000 ml of water. White crystals deposited were filtered, washed with water and dried. Thus, 161 g of p-nitrobenzaldoxime was obtained. Yield 97%; M.P. 128°-131° C.

16.6 g (0.1 mol) of this p-nitrobenzaldoxime, 14.7 g (0.12 mol) of benzoic acid, 0.2 g of a 5% Pd-C catalyst and 150 ml of methanol were charged into a hermetically sealed glass container and vigorously stirred while charging hydrogen. Reaction was continued at temperatures of 30°-40° C. for 10 hours.

After the reaction the resulting mixture was filtered to remove the catalyst and concentrated under reduced pressure to remove almost the methanol. To a yellow viscous liquid thus obtained was 32 g (0.2 mol) of a 25% aqueous solution of sodium hydroxide added and stirred at temperatures of 80°-90° C. Thereafter the resulting mixture was allowed to stand and then, separated to two layers. The lower layer of colorless, transparent liquid which is an aqueous solution of benzoic acid sodium was removed and then, a red-brown and transparent oily liquid was obtained, which was then subject to vacuum distillation. Thus 9.7 g of fractions of 129°-130° C./5-6 mmHg was obtained, which is p-aminobenzylamine. Yield 79.5%; Purity 99%.

| Elementary analysis C$_7$H$_{10}$N$_2$ | | | |
|---|---|---|---|
| | C | H | N |
| Cal. (%) | 68.8 | 8.25 | 22.9 |
| Found (%) | 68.4 | 8.3 | 22.7 |

EXAMPLE 21

The procedure of Example 20 was repeated except using 7.1 g (0.06 mol) of succinic acid instead of benzoic acid and 10.1 g of p-aminobenzylamine was obtained (yield 82.7%).

EXAMPLE 22

52.9 g (0.35 mol) of o-nitrobenzaldehyde was dissolved in 150 ml of methanol and an aqueous solution of 27.8 g (0.38 mol) of hydroxylamine hydrochloride in 35 ml of water was added dropwise over 30 minutes while maintaining the temperature at 30° C. The mixture was stirred at the same temperature for 2 hours and diluted with 300 ml of water. White crystals deposited were filtered, washed with water and dried. Thus, 53 g of o-nitrobenzaldoxime was obtained. Yield 91%; M.P. 95°-98° C.

16.6 g (0.1 mol) of this o-nitrobenzaldoxime, 0.83 g of a 5% Pd-C catalyst, 12 g (0.2 mol) of glacial acetic acid and 100 ml of tetrahydrofurane were charged into a hermetically sealed glass container and stirred vigorously while charging hydrogen. Reaction was continued at temperatures of 25°-35° C. for 7 hours. After the reaction, the resulting mixture was filtered to remove the catalyst, was added with 8 g (0.2 mol) of sodium hydroxide and was subject to distillation. Thus, 9.7 g of o-aminobenzylamine was obtained. Yield 79.4%; Purity 99.4%; B.P. 91°-93° C./1 mmHg. M.P. 58°-61° C.

| Elementary analysis C$_7$H$_{10}$N$_2$ | | | |
|---|---|---|---|
| | C | H | N |
| Cal. (%) | 68.8 | 8.25 | 22.9 |
| Found (%) | 68.7 | 8.3 | 22.1 |

What is claimed is:

1. A process for the production of aminobenzylamine which comprises catalytically reducing at a pressure of not more than 50 kg/cm$^2$·G nitrobenzaldoxime represented by general formula I,

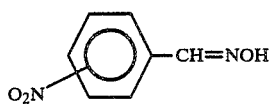

I wherein the nitro group is in o-, m-, or p-position in the presence of a compound selected from the group consisting of boric acid, phosphoric acid and/or anhydrides thereof and CO$_2$ gas.

2. The process of claim 1 wherein the catalytic reduction is carried out in an organic solvent.

3. The process of claim 2 wherein said organic solvent is selected from alcohols, glycols, ethers, aliphatic hydrocarbons, aromatic hydrocarbons, esters and halohydrocarbons.

4. The process of claim 1 wherein said nitrobenzaldoxime is obtained by reacting the corresponding nitrobenzaldehyde with hydroxylamine.

* * * * *